(12) United States Patent
Schütz

(10) Patent No.: US 7,163,189 B2
(45) Date of Patent: Jan. 16, 2007

(54) TAPPING VALVE OF PLASTICS MATERIAL FOR TRANSPORT AND STORAGE CONTAINERS FOR LIQUIDS

(75) Inventor: Udo Schütz, Selters/Westerwald (DE)

(73) Assignee: Protechna S.A., Fribourg (CH)

( * ) Notice: Subject to any disclaimer, the term of this patent is extended or adjusted under 35 U.S.C. 154(b) by 0 days.

(21) Appl. No.: 10/626,328

(22) Filed: Jul. 23, 2003

(65) Prior Publication Data

US 2004/0124387 A1      Jul. 1, 2004

(30) Foreign Application Priority Data

Aug. 13, 2002   (DE)   ............................ 202 12 421 U

(51) Int. Cl.
  *F16K 1/22*   (2006.01)
  *F16K 5/06*   (2006.01)
(52) U.S. Cl. .................. 251/148; 251/305; 251/315.02; 251/315.03; 251/315.01; 251/315.1; 251/368
(58) Field of Classification Search ................ 251/305, 251/315.01, 315.03, 315.05, 315.1, 148
See application file for complete search history.

(56) References Cited

U.S. PATENT DOCUMENTS 4,523,740 A * 6/1985 Paitchell ................ 251/315.14
5,257,639 A * 11/1993 Prescott et al. ........ 251/129.08
5,360,036 A * 11/1994 Kieper ....................... 251/148
5,396,922 A * 3/1995 Ottens .................... 251/315.15
5,606,992 A * 3/1997 Erickson et al. ........ 251/129.14
5,857,622 A * 1/1999 Holt ....................... 251/315.13
6,029,948 A * 2/2000 Shafer ..................... 251/315.05
6,135,144 A * 10/2000 Rozek ......................... 137/540
6,302,132 B1 * 10/2001 Lay ........................... 251/315.1
6,679,282 B1 * 1/2004 Aoki et al. .................... 137/43

FOREIGN PATENT DOCUMENTS

DE     195 11 723 C1    8/1996
DE     298 24 096 U1    5/2000

* cited by examiner

*Primary Examiner*—John Bastianelli
(74) *Attorney, Agent, or Firm*—Friedrich Kueffner

(57) ABSTRACT

A tapping valve of plastics material for transport and storage containers for liquids, which is constructed as a flap valve or ball valve, includes a valve housing with an inlet connection connectable to an outlet connection of the liquid container and an outlet connection, wherein the outlet connection of the valve body is welded to the male part of a Kamlok coupling for connecting a discharge hose. The valve housing is of a polyethylene of high density and the male part of the Kamlok coupling is of a glass fiber-reinforced polyethylene of high density.

1 Claim, 1 Drawing Sheet

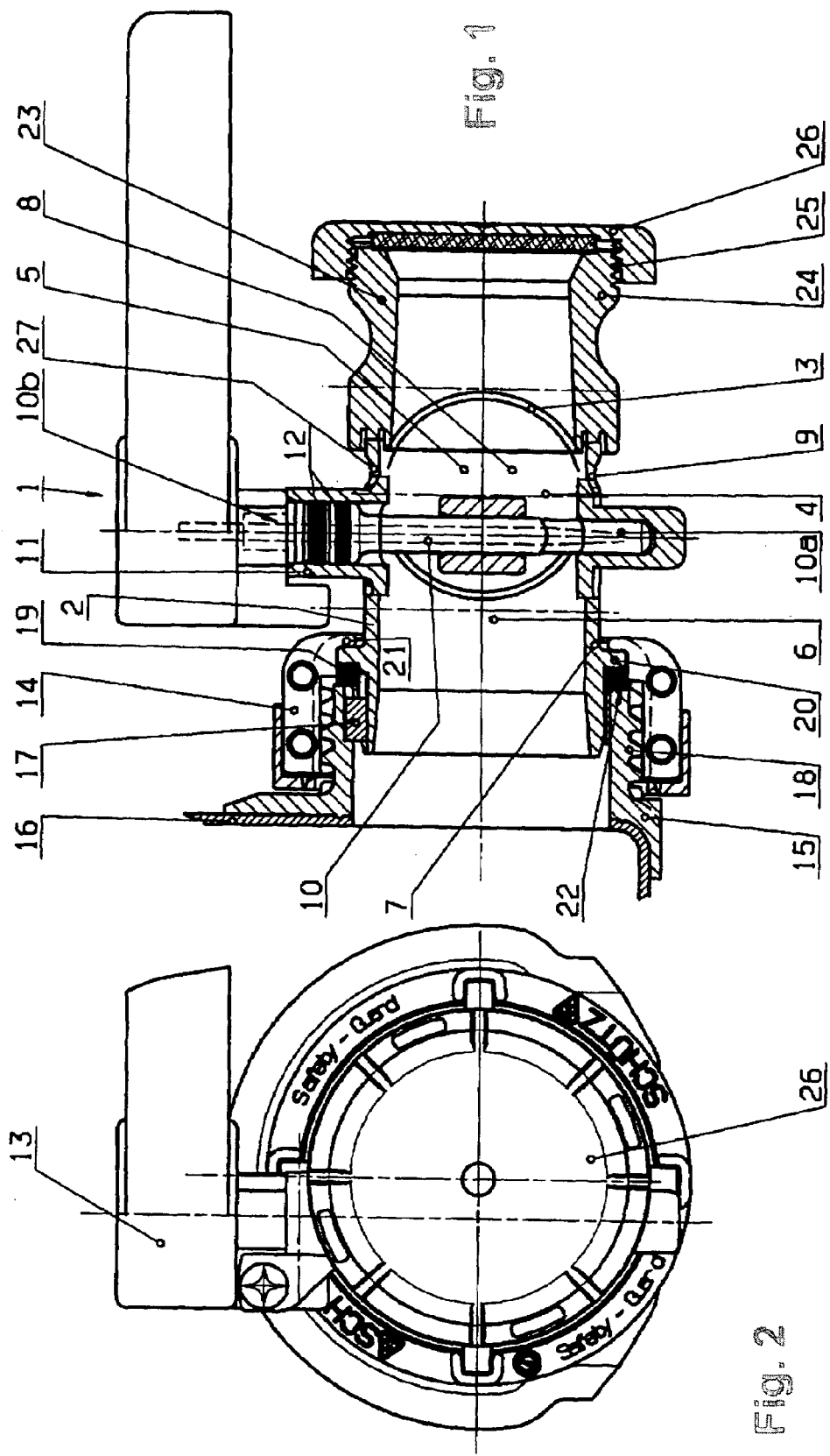

TAPPING VALVE OF PLASTICS MATERIAL FOR TRANSPORT AND STORAGE CONTAINERS FOR LIQUIDS

BACKGROUND OF THE INVENTION

1. Field of the Invention

The present invention relates to a tapping valve of plastics material for transport and storage containers for liquids.

2. Description of the Related Art

DE 298 24 096.3 U1 discloses a tapping valve constructed as a flap valve or ball valve with a valve housing having an inlet connection connectable to the outlet connection of the liquid container and an outlet connection, wherein the outlet connection of the valve housing is welded to the male part of a Kamlok or quick disconnect coupling for connecting a tapping hose.

Tapping valves of the above-described type constructed as flap valves are used, for example, in liquid containers as they are disclosed in DE 195 11 723 C1; these liquid containers include a pallet-like base frame, an exchangeable inner container of plastics material with four side walls, a lower and an upper bottom, an inlet connection and an outlet connection, and with an outer casing surrounding the inner container, wherein the outer casing is constructed as a casing of sheet metal or grating having vertical and horizontal grate rods of metal.

In the flap valve described in DE 298 24 096.3 U1, the valve housing and the male part of a Kamlok coupling welded to the outlet connection of the valve housing are of a polyethylene of high density (PE-HD). This plastics material provides the valve housing and the male part of the Kamlok coupling with a limited elasticity; this elasticity is desired in the valve housing in order to achieve a tight closed position of the flap disc; however, in the male part of the Kamlok coupling, this elasticity has the disadvantage that when the female part of the Kamlok coupling, which is attached to the connecting end of a discharge hose, is tightened on the slightly elastically deformable male part by means of the clamping levers provided on the female part, it is not possible with the desired certainty to ensure a tight connection of the discharge hose.

SUMMARY OF THE INVENTION

Therefore, it is the primary object of the present invention to further develop the Kamlok coupling used together with the tapping valve for liquid containers of the above-described type for connecting a discharge hose to the valve housing to achieve an optimum tightness.

In accordance with the present invention, the valve housing is of a polyethylene of high density (PE-HD) and the male part of the Kamlok coupling is of a glass fiber-reinforced polyethylene of high density.

The tapping valve according to the present invention constitutes a simple and advantageous solution for meeting the above object.

Rectangles.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a longitudinal sectional view of a flap valve; and

FIG. 2 is a front view of the flap valve.

DETAILED DESCRIPTION OF THE INVENTION

The valve housing 2 of a flap valve 1 made of polyethylene of high density (PE-HD) contains a flap disc 3 for opening and closing the central through-opening 4 of the housing chamber 5 which is in communication with the inlet duct 6 of the inlet connection 7 and the outlet duct 8 of the outlet connection 9 of the valve housing 2. The flap disc 3 is eccentrically fastened at a rotary shaft 10 whose one end 10a is rotatably mounted in the valve housing 10 and whose end 10b protrudes outwardly of the valve housing 2 through a connecting piece 11. The rotary shaft 10 is sealed relative to the outside by means of sealing rings 12 in the connecting piece 11. Mounted on the end 10b of the rotary shaft 10, which protrudes out of the valve housing 2, is a handle 13 for opening and closing the flap valve 1.

The flap valve 1 is fastened by means of a union nut 14 to the outlet connection 15 of a liquid container 16, for example, an inner plastic container of a pallet container, wherein, during blow molding of the liquid container, the outlet connection, which is prefabricated as an injection molded plastic component, is placed in the blow mold and is blown onto the liquid container.

An adaptor ring 17 of plastics material which is welded or glued onto the inlet connection 7 of the valve housing 2 serves to secure against rotation the valve housing 2 which is placed with the inlet connection 7 in the outlet connection 15 of the liquid container 16, on the one hand, and for positioning the valve housing 2 when the valve housing 2 is pushed with the inlet connection 7 into the outlet connection 15 of the liquid container 16, on the other hand.

When the union nut 14, which is mounted captive on the inlet connection 7 of the valve housing 2, is screwed onto the outlet connection 15 of the liquid container 16 which is provided with a corresponding external thread 18, a sealing ring 19 arranged on the inlet connection 7 of the valve housing 2 is clamped between a collar 20 of the inlet connection 7, which is acted upon by an annular protrusion 21 of the union nut 14, and the end face 22 of the outlet connection 15 of the liquid container 16 and, as a result, a liquid-tight connection is achieved between the flap valve 1 and the liquid container 16.

Welded to the outlet connection 9 of the valve housing 2 is the male part 23 of a Kamlok coupling for connecting the connecting end of a discharge hose which is provided with a corresponding female part. The male part 23 is manufactured as an injection molded part of a glass fiber-reinforced polyethylene of high density (PE-HD). The outer end 24 of the male part 23 has an external thread 25, so that a protective cap 26 can be screwed onto the outer end 24 during transport of the liquid container 16.

The polyethylene material of high density provides the valve housing 2 with a limited elasticity which, in the closed position of the flap disc 3, facilitates a tightly closed position of the flap disc of the flap valve 1 as a result of an elastic expansion of the valve seat of the valve housing 2.

The hardness of the polyethylene material of high density achieved by admixing glass fibers of the male part 23 of the Kamlok coupling welded to the outlet connection 9 of the valve housing 2 facilitates a tight connection of the flap valve 1 with a discharge hose to whose connecting end is attached the female part of the Kamlok coupling which is clamped onto the male part by means of clamping levers provided on the female part.

A reduced diameter portion 27 of the outlet connection 9 of the valve housing 2 results in a mutual uncoupling of the valve housing 2 of limited elasticity and the rigid male part 23 of the Kamlok coupling, so that the desired different material properties of the valve housing and the male part of the Kamlok coupling do not negatively influence each other.

The construction principle described above in connection with flap valves can also be used in ball valves.

While specific embodiments of the invention have been shown and described in detail to illustrate the inventive principles, it will be understood that the invention may be embodied otherwise without departing from such principles.

I claim:

1. A tapping valve of plastics material for transport and storage containers for liquids, wherein the tapping valve is constructed as a flap valve or ball valve, the tapping valve comprising a valve housing with an inlet connection connectable to an outlet connection of the liquid container and an outlet connection, wherein the outlet connection of the valve housing is welded to a male part of a quick disconnect coupling for connecting a discharge hose, wherein the valve housing with the inlet connection and the outlet connection is of a polyethylene of high density so as to give the housing a slight elasticity, and the male part of the quick disconnect coupling is welded to the outlet connection of the valve housing and is of a glass fiber-reinforced polyethylene of high density so as to give the male part of the coupling a high hardness that is harder than the hardness of the housing, wherein the outlet connection of the valve housing has a reduced diameter portion.

* * * * *